United States Patent Office 3,836,640
Patented Sept. 17, 1974

3,836,640
METHOD FOR THE CHEMICAL STERILIZATION OF MALE ANIMALS
Kenneth A. Laurence, 38 Pamela Lane,
Valhalla, N.Y. 10595
No Drawing. Filed Apr. 28, 1972, Ser. No. 248,409
Int. Cl. A61k *17/06*
U.S. Cl. 424—108                    8 Claims

ABSTRACT OF THE DISCLOSURE

Male animals can be sterilized by administering a foreign luteinizing hormone to the animal before it has attained puberty. The luteinizing hormone must be capable of producing an antibody in the animal which has cross-reactivity with the gonadotropins normally produced by the animal. The presence of the antibody deters the maturation of the gonads and adnexal glands and inhibits spermatogenesis at the spermatogonial level.

---

The present invention relates to a process for sterilization of male animals by administering to the animal before it has attained the age of puberty a foreign luteinizing hormone which produces antibodies in the animal which have cross-reactivity with the gonadotropins normally produced by the animal. Luteinizing hormones are well-known in the art and are the gonadotropic hormones found in the anterior lobe of the pituitary gland. They are interstitial cell stimulants and in the male, stimulate the interstitial cells of the testes to secrete testosterone. *The Merck Index,* 8th edition, p. 560 (1968), *Encyclopedia of Chemical Technology,* Vol. 7, pp. 487–488 (1951).

The administration of luteinizing hormones to adult animals after they have attained the age of puberty in order to atrophy their reproductive organs and cause a decrease in libido has been performed by various prior art investigators. M. Talaat and K. A. Laurence, *Fertility and Sterility,* Vol. 22, No. 2, February 1971, pp. 113–118, M. H. Pineda, D. C. Lueker, L. C. Faulkner and M. L. Hopwood, *Proceedings of the Society for Experimental Biology and Medicine,* Vol. 125, No. 3, July 1967, pp. 665–668, and S. K. Quadri, L. H. Harbers, and H. G. Spies, *Proc. Soc. Exp. Biol. Med.,* Vol. 123, pp. 809–814 (1966). These experiments have involved the impairment of spermatogenesis in the intact adult animal by interrupting the spermatogenic cycle.

In the present invention the luteinizing hormone is administered to an animal prior to its having attained puberty rather than after this age has been attained. It has been found that this early stimulation of the immunologic system leads to the development of a high titered antiserum to the luteinizing hormone which remains at a high level without further exogenously administered boosters. Periodic boosters are normally necessary in adult animals to maintain high levels of neutralizing antibodies. It has been postulated that due to the early antigenic stimulation, the formation of antibodies is more continuously stimulated by the release of endogenous hormones. This early immunization with the luteinizing hormone deters the maturation of the gonads and adnexal glands and inhibits spermatogenesis at the spermatogonial level. The interstitial tissues are fibroblastic in character after this early immunization is performed.

The present invention is a simple chemical means for the sterilization of male animals before they reach puberty and has wide application in those fields in which a simple, non-surgical sterilization technique for such animals is desired. One typical use for the present invention is in the chemical sterilization of young male animals to improve the meat quality of the animal and its taste.

The present process can be used on a wide variety of animals, including bulls, boars, rams, male goats, male rats, and male geese, chickens and turkeys, male horses, male dogs and male cats. It is, however, necessary that the luteinizing hormone that is selected be foreign to the animal which is to be treated and that it produce antibodies that have a cross-reactivity with the gonadotropin hormones customarily produced by the animal. The effect of this antibody in the animal will suppress the formation of the gonadotropin hormones and will prevent maturation of the gonads and adnexal glands. Some suitable luteinizing hormones that can be selected include the bovine, ovine and pig luteinizing hormones.

It has been found that the ovine luteinizing hormone can induce antibody production in the male rat and dog which successfully neutralizes the endogenous hormones in the recipient animals. There is a definite cross reaction between the antibody in the rabbit to the ovine luteinizing hormone as well as to the rat and bovine luteinizing hormones. Although the antigenic structure of each of the above-mentioned luteinizing hormones is not identical each possesses a similarity which insures production of antibodies having sufficient cross-reactivity with the other named hormones so that it is possible for the antibody that is formed to neutralize the hormonal action of the animal's own gonadotropic hormone. There is a similar pattern of cross reaction between the ovine, bovine and canine gonadotropins and the antibody formed by each of them in a foreign animal as well. It has been found that the ovine gonadotropin can be given to male calves and that the bovine luteinizing hormone can be administered to the ram. Either ovine or bovine luteinizing hormone can be administered to the male dog.

The luteinizing hormone used in the process of the present invention should be administered by the parenteral route by either subcutaneous, intradermal or intramuscular injection. This route of administration insures that the hormone is made more completely available for production of the necessary antibodies. The luteinizing hormone selected for administration should be in an emulsion containing a suitable adjuvant. The adjuvant reduces the immediate availability of the antigen thereby providing a depot from which the antigen is released slowly for a prolonged period of time. Suitable adjuvants include Freunds complete adjuvant, Freunds incomplete adjuvant (Parke-Davis), or sodium alginate. Freunds complete adjuvant contains paraffin oil, aqua base and heat-killed Mycobacteria, or other acid fast bacterial forms. Freunds incomplete adjuvant contains all of the above except the bacteria.

The minimum effective dose of luteinizing hormone, e.g. bovine, to small animals, such as rabbits, is 0.5 mg. of hormone. Use of more than 1.0 mg. is effective although use of such high levels is unnecessary. As much as 10.0 mg. of bovine luteinizing hormone has been given to new born rabbits without causing any ill effects. Use of luteinizing hormones, such as the ovine or bovine hormones, with larger animals, such as male dogs, should be carried out using a minimum effective dose of 1.0 mg. to 5.0 mg.

A luteinizing hormone which has been chosen in a particularly preferred embodiment of the invention is a bovine luteinizing hormone identified by the code number NIH–LH–B6. It can be obtained from the Endocrine Study Sections of the National Institutes of Health. It is advantageously dissolved in a sodium chloride solution and is emulsified by constant mixing with a suitable adjuvant, such as Freunds adjuvant. The emulsion containing the hormone, when administered to pre-pubertal animals, deters development of the gonad and adnexal glands without giving any outward signs of distress or malaise to those animals.

It is believed that the antibody formed in the animal upon challenge with the luteinizing hormone prevents the synthesis of $\Delta^5$-$3\beta$-hydroxysteroid dehydrogenase (OHSDH)

or other enzymes responsible for androgen production. It is believed that the androgen production under the influence of the luteinizing hormone is the stimulus for completion of the spermatogenic cycle past the spermatogonial stage. W. O. Nelson, *Ciba Foundation Coloquia Endocrinology*, Vol. 4, p. 271 (1955).

The following example illustrates a particularly preferred embodiment of the invention claimed herein.

EXAMPLE

Ten male, newborn, white, New Zealand rabbits were immunized with a bovine luteinizing hormone (NIH-LH-B6)

on the twenty-first day of age. The solution containing the luteinizing hormone was formed by placing 2.0 mg. of the luteinizing hormone in each ml. of a 0.9 wt. percent sodium chloride solution. The luteinizing hormone-NaCl solution that was formed by this operation was then emulsified by constant mixing with an equal volume of complete Freunds adjuvant (Difco, Detroit, Mich.). Each of the ten rabbits then received 1 mg. of luteinizing hormone per injection via the intradermal route in multiple sites in the nuchal region. Four male controls received the saline-adjuvant mixture. Each of the ten males immunized with the luteinizing hormone received a second immunization seven days later. The controls received a second injection of the saline-adjuvant mixture one week later.

The animals which had been immunized were not further challenged with the antigens. There was, however, gross external observation of each animal weekly to determine the general state of health and to observe their external genitalia.

Serum samples were obtained and tested for antibody content three months after immunization and at the termination of the experiment which occurred after seven months. The serologic tests involved the hemagglutionation test of Boyden as described in Vol. 93, *J. Exp. Med.*, p. 107 (1951), and an agar gel diffusion test. For the hemagglutination procedure tanned sheep red blood cells were modified with bovine luteinizing hormone in saline solution at a concentration of 0.02 and 0.002 mg. of LH/ml. For the agar gel diffusion technique, commercially available diffusion discs (Pentex, Miles Laboratories, Inc., Kankakee, Ill.) were utilized. The center wells were charged with 2.0 mg./ml. LH with the satellite wells charged with the undiluted antiserum of each experimental animal.

After four months, it was visually observed that the male rabbits immunized with the luteinizing hormone were easily observed. It was not possible to localize the testes in the immunized group and neither the scrotum nor the penis had developed. At no point during the experiment was it possible by visual inspection to distinguish between the immunized males and female rabbits.

All of the immunized males demonstrated antibodies to the bovine luteinizing hormone, both at three and seven months. The titers at three months were somewhat higher than at seven months and were appreciable, ranging from 1:360 to 1:2560. Antibody titer is expressed as the highest dilution of serum causing agglutination of luteinizing hormone-coated red blood cells. It was noted that there was an apparent correlation between the antibody titer and the size of the testes. The higher the titer, the smaller were the testes. The agar gel diffusion technique showed two distinct antigen antibody reactions.

During the seventh month of the experiment, the animals were sacrificed and the gonads and any adnexal glands were removed, weighed, and then fixed in Bouin's solution which is a solution of formaldehyde, glacial acetic acid and trinitrophenol. Sections were prepared at $5.0\mu$ and stained with hematoxylin and eosin.

It was found that the average weight of both testes, after removal at seven months of age, was $6.752 \pm 0.927$ gm. in the adjuvant control group, but was only $0.1710 \pm 0.342$ gm. in the group that had been immunized with the luteinizing hormone. The mean average weight of the testes from the luteinizing hormone immunized rabbits was therefore about $\frac{1}{40}$ of that of the control group.

Upon histological examination, the spermatogenic cycle appeared arrested almost uniformly at the spermatogonial stage of development in the rabbits which had been immunized with the luteinizing hormone. In contrast, the testes of the adjuvant controls consisted of seminiferous tubules with a complete spermatogenic cycle. It was also observed that the interstitial tissue of the animals immunized with the hormone was fibroblastic with no typical Leydig cells apparent.

I claim:

1. A process for the sterilization of a male animal which conmprises administering a foreign luteinizing hormone to the animal before it attains puberty, the foreign luteinizing hormone being capable of producing in the animal an antibody which has cross-reactivity with gonadotropins produced by the animal.

2. A process as claimed in claim 1 wherein the luteinizing hormone is selected from the group consisting of bovine, ovine, canine, rabbit and pig luteinizing hormones.

3. A process a claimed in claim 1 wherein the animal is selected from the group consisting of bulls, boars, rams, male goats, male rats, male geese, male chickens and male turkeys, male horses, male dogs and male cats.

4. A process as claimed in claim 1 where the luteinizing hormone is administered by injection.

5. A process as claimed in Claim 1 wherein the male animal which is sterilized is a rabbit.

6. A process as claimed in claim 4 wherein the rabbit receives at least 0.5 mg. of luteinizing hormone.

7. A process as claimed in claim 1 wherein the male animal which is sterilized is a dog.

8. A process as claimed in claim 7 wherein the dog receives at least 1.0 m. to 5.0 mg. of luteinizing hormone.

References Cited

Monastirsky et al.: Chem. Abst., vol. 74 (1971), pp. 137, 685Z.

Hall: Chem. Abst., vol. 75 (1971), p. 95020S.

Talaat et al.: Chem. Abst., vol. 74 (1971), p. 83617h.

SAM ROSEN, Primary Examiner

O-1050
(5/69)

UNITED STATES PATENT OFFICE
CERTIFICATE OF CORRECTION

Patent No. 3,836,640     Dated September 17, 1974

Inventor(s) Kenneth A. Laurence

It is certified that error appears in the above-identified patent and that said Letters Patent are hereby corrected as shown below:

Col. 3, line 58, before "were" insert --were retarded in their sexual maturation whereas the adjuvant control males had external genitalia that --;

Col. 4, line 34, "conmprises" should read --comprises--;

Col. 4, line 43, "a" should read --as--;

Col. 4, line 47, "where" should read --wherein--;

Col. 4, line 49, "Claim" should be --claim--;

Col. 4, line 51, "claim 4" should be --claim 5--; and

Col. 4, line 60, "pp." should be --p.--.

Signed and sealed this 17th day of December 1974.

(SEAL)
Attest:

McCOY M. GIBSON JR.
Attesting Officer

C. MARSHALL DANN
Commissioner of Patents